(12) United States Patent
Riebel et al.

(10) Patent No.: US 8,003,069 B2
(45) Date of Patent: Aug. 23, 2011

(54) CARBON BLACK, METHOD FOR THE PRODUCTION OF CARBON BLACK OR OTHER FLAME AEROSOLS, AND DEVICE FOR CARRYING OUT SAID METHOD

(75) Inventors: Ulrich Riebel, Briesen (DE); Matthias Katzer, Schluechtern (DE); Kai Krauss, Huerth (DE); Alfons Karl, Gruendau (DE); Juergen Behnisch, Madison, NJ (US)

(73) Assignee: Evonik Carbon Black GmbH, Hanau (DE)

( * ) Notice: Subject to any disclaimer, the term of this patent is extended or adjusted under 35 U.S.C. 154(b) by 0 days.

(21) Appl. No.: 12/813,192

(22) Filed: Jun. 10, 2010

(65) Prior Publication Data
US 2010/0248120 A1 Sep. 30, 2010

Related U.S. Application Data

(62) Division of application No. 10/570,424, filed as application No. PCT/EP2004/009439 on Aug. 24, 2004, now abandoned.

(30) Foreign Application Priority Data

Sep. 4, 2003 (DE) .................................. 103 40 884

(51) Int. Cl.
*C01B 31/02* (2006.01)
(52) U.S. Cl. ........ 423/450; 423/615; 423/335; 423/452; 106/437
(58) Field of Classification Search .................. 423/450, 423/445.1, 445.2, 335, 613, 452; 106/473
See application file for complete search history.

(56) References Cited

U.S. PATENT DOCUMENTS

| | | | | |
|---|---|---|---|---|
| 706,001 A | * | 7/1902 | Ogilvy | 423/452 |
| 2,427,509 A | * | 9/1947 | Reardon | 423/452 |
| 3,647,377 A | * | 3/1972 | Hilgers et al. | 423/613 |
| 3,978,019 A | * | 8/1976 | Oelmann et al. | 524/496 |

(Continued)

FOREIGN PATENT DOCUMENTS

DE 24 04 536 1/1974

(Continued)

OTHER PUBLICATIONS

"Industrial Carbon: Its Elemental, Adsorptive and Manufactured Forms". C. L. Mantell 1947, p. 60.*

(Continued)

*Primary Examiner* — Stuart Hendrickson
*Assistant Examiner* — Richard M Rump
(74) *Attorney, Agent, or Firm* — Smith, Gambrell & Russell, LLP (57) ABSTRACT

The invention relates to a method for producing carbon black or other flame aerosols, comprising the following steps: the heat is removed from the flame by dissipation and/or radiation; a thin gas boundary layer is formed; the flow formed by the flame and the gas boundary layer is accelerated or expanded; the obtained aerosol is withdrawn; and the cooling surface is cleaned. The invention further relates to a device for carrying out such a method and a black carbon having a maximum pH value of 6.0, a maximum ignition residue of 0.1 percent, and a maximum 5 μm screening refuse of 200 ppm. The inventive black carbon can be used in rubber, plastic, printing inks, inks, inkjet inks, toners, lacquers, dyes, paper, bitumen, concrete, and other construction materials.

23 Claims, 8 Drawing Sheets

U.S. PATENT DOCUMENTS

| | | | |
|---|---|---|---|
| 4,302,423 A | | 11/1981 | Cheng et al. |
| 4,447,401 A | * | 5/1984 | Casperson et al. ............ 422/151 |
| 4,559,218 A | * | 12/1985 | Flemmert ..................... 423/336 |
| 6,057,387 A | | 5/2000 | Mahmud et al. |
| 6,087,434 A | * | 7/2000 | Hisashi et al. ................ 524/495 |
| 6,946,101 B1 | | 9/2005 | Jing |
| 2005/0014863 A1 | | 1/2005 | Babler |
| 2009/0035210 A1 | | 2/2009 | Krauss et al. |

FOREIGN PATENT DOCUMENTS

| | | |
|---|---|---|
| DE | 103 51 737 | 6/2005 |
| EP | 1 055 877 A1 | 11/2000 |
| JP | 06-57170 | 3/1994 |
| JP | 06057170 A * | 3/1994 |
| WO | 94/05732 | 3/1994 |

OTHER PUBLICATIONS

Helsper, C. et al., "Investigations of a New Aerosol Generator for the Production of Carbon Aggregate Particles," Atmospheric Environment, 1993, pp. 1271-1275, vol. 27A, No. 8, Pergamon Press Ltd., Great Britain.

Jing, Lianpeng, "Neuer Russgenerator für Verbrennungsrussteilchen zur Kalibrierung von Partikelmessgeräten," OFMETInfo, 2000, pp. 8-12, vol. 7, No. 2.

"Industrial Carbon: Its Elemental, Adsorptive and Manufactured", C. L. Mantel 1947, p. 60.

Gomez et al., "Thermophoretic Effects on Particles in Counterflow Laminar Diffusion Flames", Combust. Sci. and Tech, 1993, vol. 89, pp. 335-362.

George et al., "Formation of $TiO_2$ Aerosol from the Combustion Supported Reaction of $TiCl_4$ and $O_2$", Tioxide International, Central Laboratories , Portack Lane, Stockton-on-Tees, Tesside, 1972, pp. 63-71.

Kammler et al., "Flame Synthesis of Nanoparticles", Chem. Eng. Technol, vol. 24, 2001, 6, pp. 583-596.

Venkataraman et al., "Size distributions of polycyclic aromatic hydrocarbons in aerosol emissions from biofuel combustion", Aerosol Science, vol. 33, 2002, pp. 503-518.

Mueller et al., "Nanoparticle synthesis at high production rates by flame spray pyrolysis", Chemical Engineering Science, vol. 58, 2003, pp. 1969-1976.

Friedlander, S.K, "Smoke, Dust, and Haze: Fundamentals of Aerosol Dynamics", *Oxford University Press*, New York, pp. 1-3 and 331-358 concerning aerosol, 2000.

Hinds, W.C., "Aerosol Technology", *John Wiley and Sons*, pp. 1-12, New York (1999).

* cited by examiner

AEROSOL ←

COMBUSTION GAS →

20

10

4

15

3

6

MOTOR

CARBON BLACK, METHOD FOR THE PRODUCTION OF CARBON BLACK OR OTHER FLAME AEROSOLS, AND DEVICE FOR CARRYING OUT SAID METHOD

CROSS REFERENCE TO RELATED APPLICATIONS

This application is a divisional of U.S. Ser. No. 10/570,424 filed Mar. 2, 2006, which is the National Stage of International Application No. PCT/EP2004/09439 filed Aug. 24, 2004, which claims the benefit of priority of German Application No. 103 40 884.3 filed Sep. 4, 2003, each of which being incorporated herein by reference.

BACKGROUND DISCUSSION

The invention relates to carbon black, a method for the production of carbon black or other flame aerosols, and a device for carrying out said method.

By means of the method according to the invention, it is intended to produce carbon black in the form of aerosols having reproducible and adjustable properties. Such properties are the carbon black concentration and the particle size distribution, the agglomeration state and the chemical composition. Such aerosols are required in order to test, for example, filters, electrostatic separators or catalysts with regard to the separation of carbon black. Furthermore, the aerosols thus obtained can be separated in order to produce, for example, pigments or fillers.

The process is also suitable for producing other aerosols producible in flames, such as, for example, $SiO_2$ or $TiO_2$ having particular properties.

The literature has to date disclosed 2 methods for producing test aerosols from carbon black.

In the arc method (C. Helsper, W. Molter, G. Wenninger: Investigation of a New Aerosol Generator for the Production of Carbon Aggregate Particles. Atmospheric Environment, Vol. 27A (1993), pp 1271-1275), an arc is ignited at short time intervals between two carbon electrodes which are present in argon gas. A small amount of the electrode material is vaporized and condenses in the argon stream to form fine carbon black particles which are discharged with the argon stream. The method has two disadvantages: firstly, the carbon black produced consists exclusively of carbon whereas real carbon black always contain proportions of hydrocarbons and oxygen which influence the properties to a very great extent. Secondly, only very small amounts of aerosol which are generally not sufficient for the abovementioned applications can be produced by this method.

In the quench gas method (L. Jing: Neuer Russgenerator für Verbrennungsrußteilchen zur Kalibrierung von Partikelmessgeräten [New carbon black generator for combustion carbon black particles for the calibration of particle measurement devices]. OFMETInfo Vol. 7 (2000), no. 2, pp 8-12), a diffusion flame is cooled by supplying a large amount of quench gas (e.g. nitrogen) and is extinguished. In this method, it is true that carbon blacks having a realistic chemical composition are produced. The very high consumption of quench gas, which gives rise to considerable costs, is problematic. This type of carbon black aerosol generator has therefore also been realized to date only for very small flow rates.

SUMMARY OF EMBODIMENTS OF THE INVENTION

It is therefore the object of the invention to provide a method by means of which large amounts of carbon black aerosol can be provided economically and with little effort.

It is a further object of the invention to provide a carbon black which can form a stable dispersion and at the same time has high purity.

The object is achieved, according to the invention, by a method comprising a combination of the following steps:
a) removal of the heat from the flame by thermal conduction and/or radiation, the heat being released at a solid, cold surface or a liquid surface,
b) formation of a thin gas boundary layer, for example of air, between the flame and the cooling surface, in order to prevent the accumulation of aerosol particles on the surface,
c) acceleration or expansion of the flow formed by the flame and the boundary layer, in order to keep the flow laminar and to achieve as thin a boundary layer as possible,
d) withdrawal of the aerosol formed from the vicinity of the cold surface and
e) cleaning of the cooling surface.

The method is based on the gas black or channel method which is known from industrial carbon black production and is modified so that the carbon black is obtained predominantly as an aerosol. In the gas black or channel method, a diffusion flame is directed against a cold metal surface, the carbon black being deposited directly from the flame on the cold surface and being scraped off from the surface later on.

In the present invention, too, a cold surface is used in order to withdraw as much heat as possible from the flame. At the same time, however, the carbon black is prevented from settling on the cold surface. This takes place according to the invention by virtue of the fact that a thin boundary layer of particle-free gas is inserted between the flame and the cold surface. Owing to the very high heat removal by the surface, it is possible to use an oxygen-containing gas, such as, for example, air, for the production of the boundary layer. However, it is also possible to supply an oxygen-free gas (e.g. $N_2$, $CO_2$), or a boundary layer having a low oxygen content can be produced by evaporating a thin water film present on the cooling surface directly by the heat of the flame.

A sufficiently thick-walled body of metal or another highly thermally conductive material can advantageously be used as the cold surface. In addition, the surface can be cooled from the back by means of water or air. However, a flowing liquid film which, by convection and by evaporation, can remove the heat to be removed from the flame can also be used as the cold surface.

The object set at the outset is also achieved by a device for carrying out the abovementioned method according to the invention, in which, in addition to a flame generation setup and a cooling surface against which the flame produced can be directed, a setup for producing a gaseous boundary layer between surface and flame is present.

BRIEF DESCRIPTION OF THE FIGURES

Further details and advantages of the invention are explained in more detail with reference to subclaims shown in the drawing.

DETAILED DESCRIPTION

Figure 1:
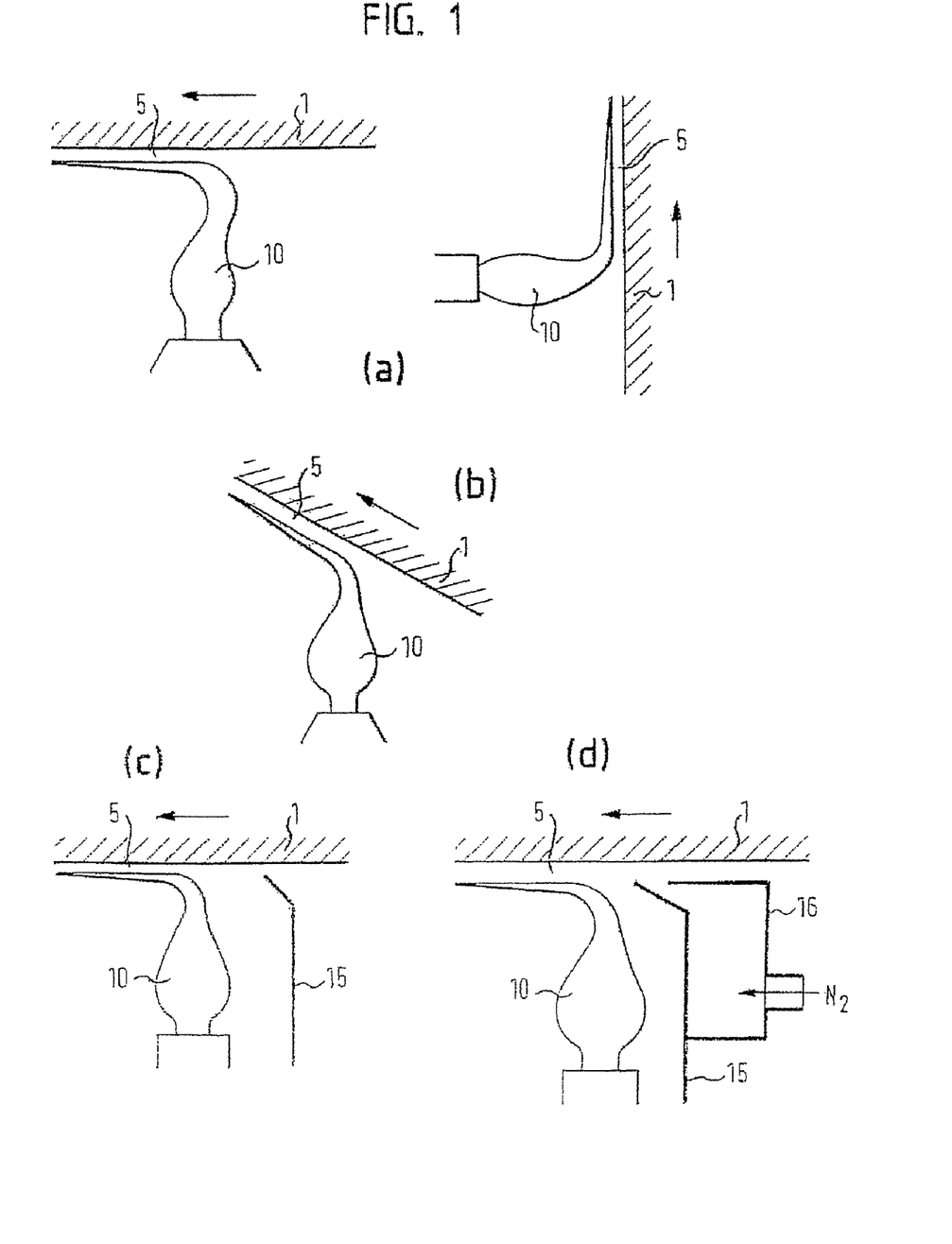
FIG. 1 schematically shows a plurality (FIGS. 1a to 1d) of working examples of the device according to the invention.

As shown in FIG. 1 with reference to different configurations, a flame 10 is directed against the cooling surface 1, a boundary layer 5 being produced between the flame 10 and cooling surface. According to FIG. 1a, the boundary layers are produced by moving the cooling surface perpendicularly to the axis of the flame 10 in the direction of the arrow. In FIG. 1b, the cooling surface 1 is moved obliquely relative to the axis of the flame 10.

As shown in FIG. 1c, it is additionally possible to provide an adjustable deflector plate 15 that permits adjustment of the boundary layer thickness and prevents the flame from being disturbed by turbulences. A further variant corresponding to FIG. 1c envisages that the deflector plate 15 is provided with a feed 16 for a gas in order to enrich the boundary layer with a desired special gas, for example $N_2$.

Alternatively or additionally, a film of water or of another readily vaporizable, nonflammable liquid can be applied to the cooling surface in order to improve the cooling effect and at the same time develop a vapor boundary layer having a flame-cooling effect when the hot flame gases are in contact with the surface. The liquid film can be produced in a known manner, for example by spraying on the liquid, by immersing the surface in a bath, by application rolls, etc. It may be advantageous to roughen the surface and to coat it with a thin layer of an absorptive material.

In further methods for producing a suitable boundary layer, the cooling surface is formed by a flowing, vaporizable liquid or consists of a porous material, e.g. sintered material, from which a gas or vaporizable liquid emerges.

Figure 2:
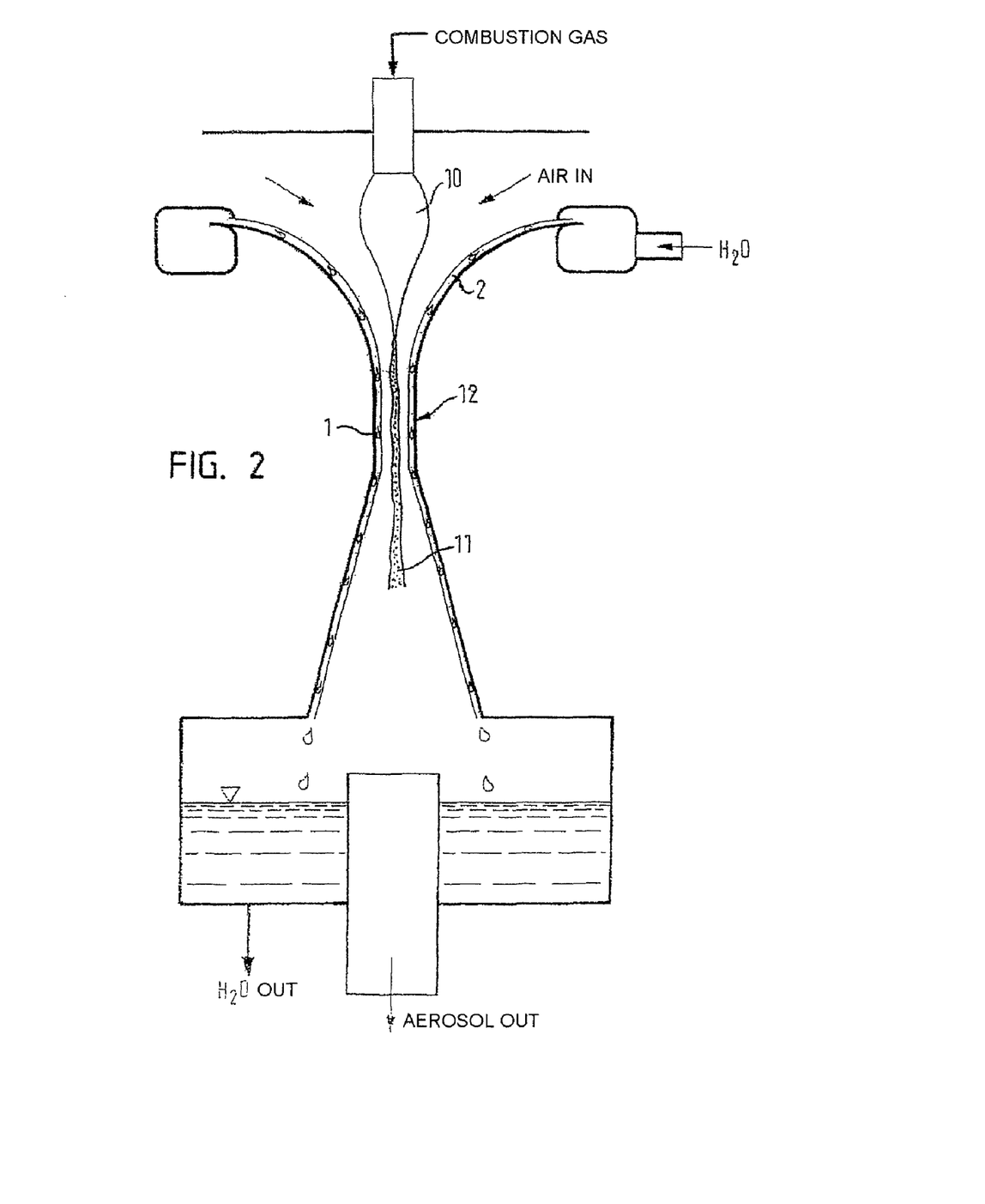
FIG. 2-9 show further schematic embodiments of the device according to the invention.
Figure 3:
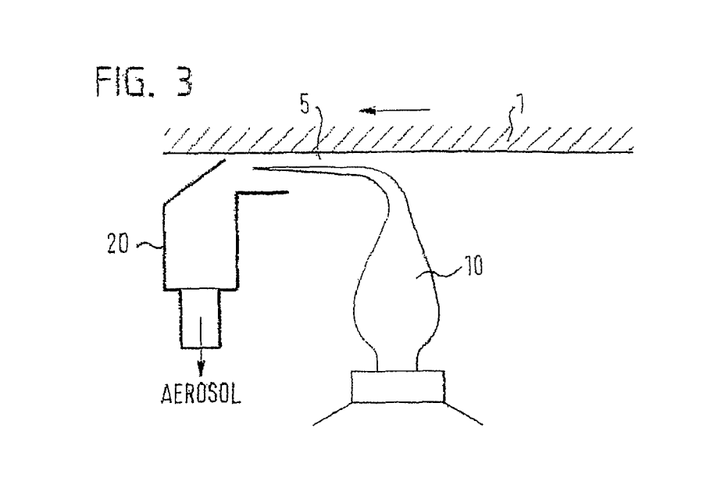
Figure 4:
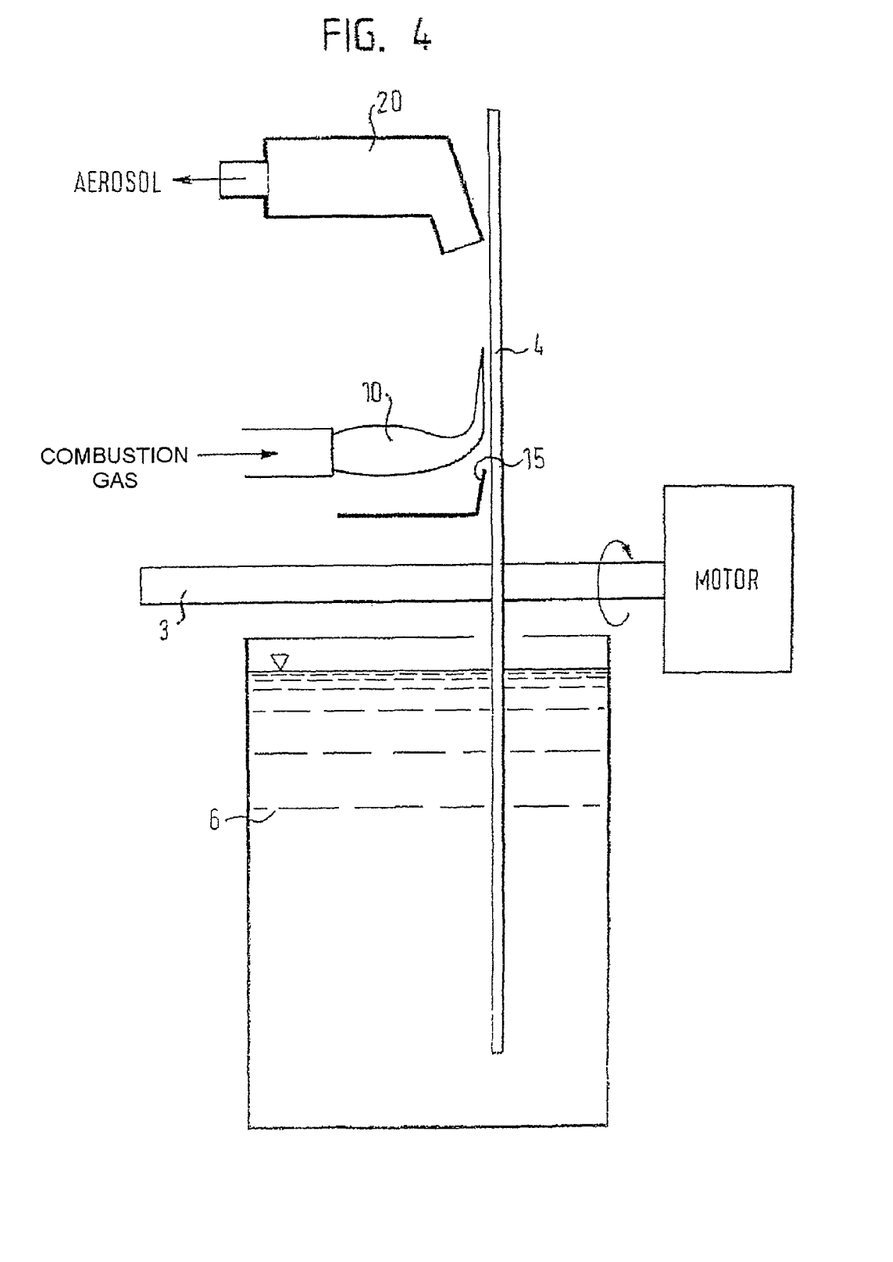
Figure 5:
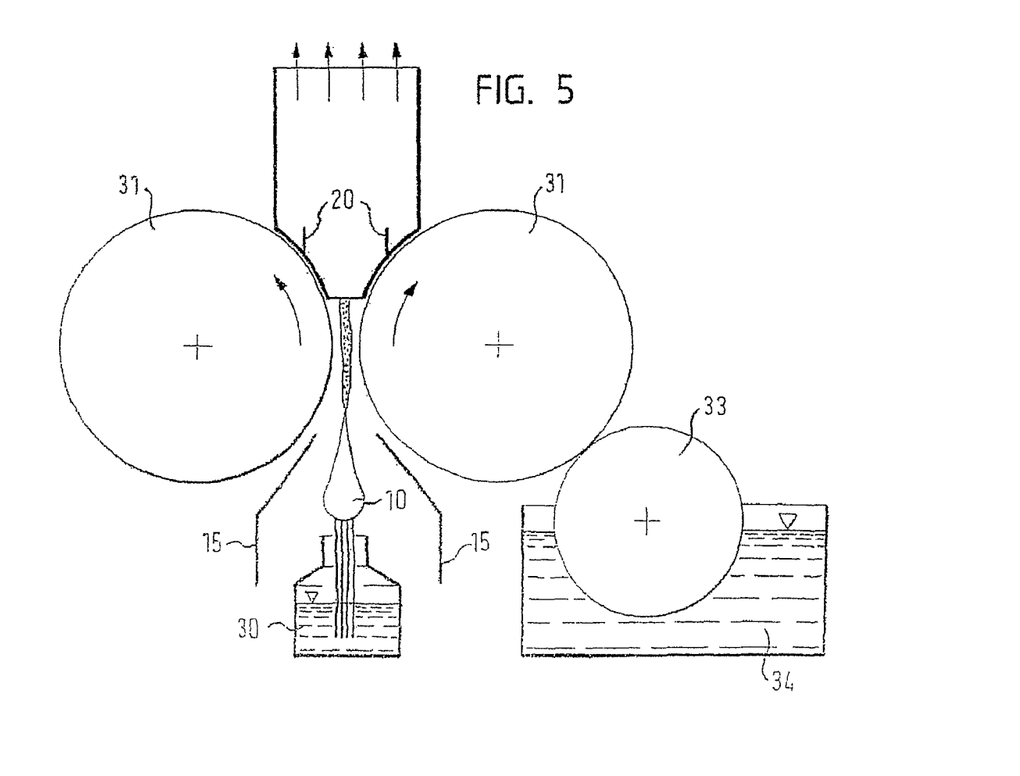
Figure 6:
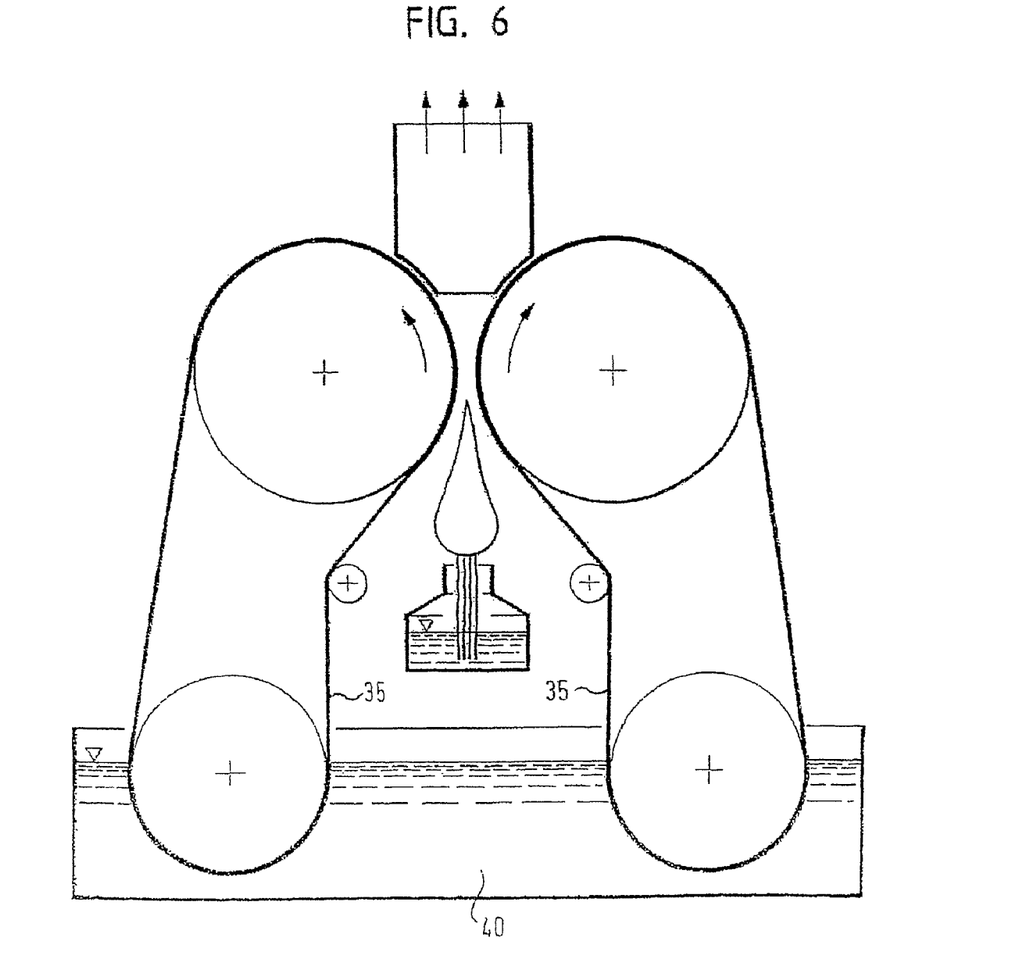
Figure 7:
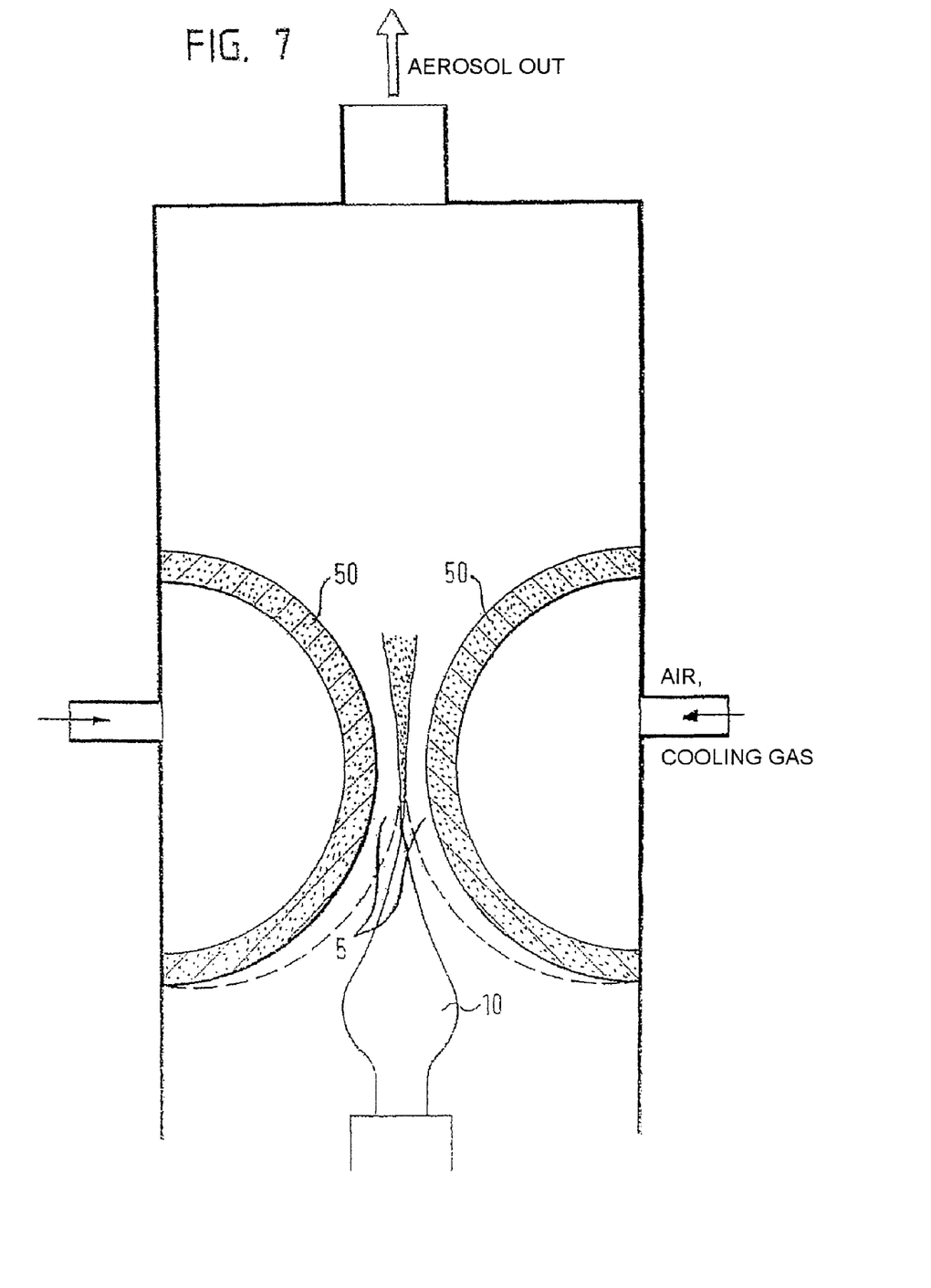

Disturbance of the boundary layer by turbulences can be particularly effectively avoided if the aerosol production takes place in an accelerated flow. As shown in FIG. 2, a flow channel between two cooling surfaces 1 can be formed for this purpose, it being possible to keep the flame 10 to be cooled and the surrounding boundary layers 5 in a laminar flow state in the convergent part 12 of a channel up to the narrowest point in spite of high flow velocities. This effect can also be achieved in a convergent nozzle having a cooling surface. In the embodiment of the invention shown in FIG. 2, the cooling surface is provided in the form of a water film 2. As a result of the downward-directed and accelerated flow of the flame 10 and of the combustion gases, the generation of turbulences and hence the undesired mixing of the resulting carbon black aerosol 11 with the gas or vapor in the boundary layer are substantially avoided.

In spite of the boundary layer, it is possible for a small part of the carbon black produced to be deposited on the cooling surface. It is therefore possible to ensure that the cooling surface is moved past a scraper, a brush, a compressed air nozzle, a liquid bath or another suitable device for keeping the surface clean.

In the production of carbon black, there is a particular difficulty that a considerable part of the aerosol is present in the direct vicinity of the cooling surface. As a result of the movement of the cooling surface or as a result of flow turbulences, this part of the aerosol may be distributed in an uncontrolled manner or may be deposited on the surface. However, in order to remove the carbon black aerosols as directly as possible and with little loss, it is intended in an embodiment according to FIG. 3 to scrape off the aerosol close to the surface directly after its production by a deflector plate 20 from the cooling surface and to collect said aerosol. Alternatively or additionally, a gas stream which detaches the aerosol from the cooling surface can be fed through a nozzle not shown here.

FIG. 4 shows an arrangement in which the cooling surface is realized by a metal plate 4 rotating about a horizontal axis 3. For cooling and for coating with a liquid film, the metal plate 4 can be immersed in a water bath 6. In the upper part, one or more flames 10 are directed toward the metal plate 4 from one side or from both sides. In addition, deflector plates 15 for adjusting the boundary layer and a deflector plate 20 for collecting the aerosol are provided. The metal plate can be cleaned by a scraper or a brush (not shown here), by a gas jet or by subjecting to ultrasound during the passage through the water bath.

The device shown in FIG. 4 is especially suitable for producing the carbon black by the combustion of gases or vaporized liquids. If the carbon black is to be produced on the basis of a flammable liquid, the arrangement shown in FIG. 5 is particularly advantageous since the flame 10 is perpendicular and is produced by means of a wick burner 30. A further peculiarity is that two cooling surfaces are provided by two rotating rolls 31. According to the invention, it is intended that the distance between the rolls, the rotational speed of the rolls and the pressure difference present at the roll gap are adjustable in order to draw out the flame to a thin layer and to cool it particularly rapidly. Furthermore, deflector plates 15 for adjusting the boundary layer and deflector plates 20 for collecting the aerosol are provided. If required, the rolls 31 can also be coated with a vaporizable liquid, for example by an application roll 33 which dips into a corresponding liquid bath 34. Finally, it is possible to ensure that the rolls are cooled from the inside, for example by washing with a cooling liquid (not shown here).

FIG. 6 shows a further variant in which the cooling surfaces are formed by revolving belts 35, for example of metal or an absorptive textile. This variant is particularly suitable if the cooling surface is to be moistened or is to be cleaned in the liquid bath 40.

The other components in the embodiment according to FIG. 6 correspond to those according to FIG. 5, so that they require no further explanation here.

Finally, FIG. 7 shows a variant in which the aerosol-free boundary layers 5 are produced without moving parts. In this case, the boundary layer is produced according to the invention by the permeation of a gas through a porous surface 50. By applying a pressure difference for accelerating the flow in the gap, the flame 10 is centered at the middle of the gap and the formation of turbulences is prevented.

In a preferred embodiment, a device according to FIG. 8 is used. This device corresponds to the embodiment shown in FIG. 2, except that the cooling surface is provided in the form of a metal surface which is cooled from the back by water. A further distinguishing feature is the direction of flow. In the embodiment shown in FIG. 8, an upward-directed flow of the flame and of the combustion gases is preferred instead of a downward-directed flow.

The method according to the invention can also be combined with the aerosol method described in DE 103 51 737.5, in order to achieve a corresponding reduction of structure. There, a salt solution, for example a potassium salt solution, is converted by means of a gas into an aerosol and then introduced into the carbon black formation zone. For example, in the preferred embodiment according to FIG. 8, the aerosol can be mixed into the carbon black raw material before the burner or can be sprayed in together with the carbon black raw material.

The invention furthermore relates to an unclassified, untreated carbon black which is characterized in that the pH is less than or equal to 6.0, preferably less than or equal to 5.0, particularly preferably less than or equal to 4.0, the residue on ignition is less than or equal to 0.1%, preferably less than or equal to 0.05%, particularly preferably less than or equal to 0.02%, and the 5 μm sieve residue is less than or equal to 200 ppm, preferably less than or equal to 150 ppm, particularly preferably less than or equal to 100 ppm.

Untreated carbon black is understood as meaning a carbon black which has not been aftertreated, for example by subsequent oxidation or chemical surface modification. Unclassified carbon black is understood as meaning a carbon black which has not been classified with the aid of an air stream.

The unclassified, untreated carbon black may be a gas black, furnace black, channel black, flame black, inversion carbon black, disclosed in DE 195 21 565, doped carbon black, thermal black, acetylene black, arc black or plasma carbon black.

The carbon black according to the invention may have a transmittance of greater than or equal to 95%, preferably greater than or equal to 97%, particularly preferably greater than or equal to 98%.

The carbon black according to the invention may have a moisture content at 950° C. of greater than or equal to 1.0%, preferably greater than or equal to 1.5%, particularly preferably greater than or equal to 2.0%.

The carbon black according to the invention may have an oil requirement of greater than or equal to 250 ml/100 g, preferably greater than or equal to 300 ml/100 g, particularly preferably greater than or equal to 350 ml/100 g.

The carbon black according to the invention can be used as a filler, reinforcing filler, UV stabilizer, conductivity carbon black or pigment.

The carbon black according to the invention can be used in rubber, plastic, printing inks, inks, inkjet inks, toners, finishes, paints, paper, bitumen, concrete and other construction materials. The carbon black according to the invention can be used as a reducing agent in metallurgy.

The carbon blacks according to the invention have the advantages that they form a stable dispersion (low pH) and at the same time have high purity (low ash content and low 5 μm sieve residue). The high purity results in substantial advantages in use. The low content of soluble substances (low ash content) permits the production of very stable dispersions, for example aqueous or solvent-containing dispersions for coating applications or inks. This has advantages in production and storage. The high stability of such dispersions permits an increase in the solids content, which in turn has numerous advantages, such as, for example, reduced production and transport costs.

Furthermore, such dispersions are distinguished by a longer shelf life.

The low content of insoluble particulate substances permits the production of films and finishes having few specks. Furthermore, the abrasion of printing plates, for example in newspaper printing, is reduced, with the result that the crispness of the printed image is maintained for longer. In addition, longer service lives of filters and strainer sieves are obtained, for example in the production of ink formulations and plastics master batches.

EXAMPLES

Methods of Determination
pH

The determination of the pH is carried out according to DIN EN ISO 787-9.
Residue on Ignition The determination of the residue on ignition is carried out according to DIN 53586 (or ISO 1125).
5 μm Sieve Residue The determination of the 5 μm sieve residue serves for determining the content of "coarse-particled", water-insoluble impurities, such as, for example, coke, ceramic components, metal or metal oxides, in the size range below 45 μm. It is carried out by means of a commercially available sieve apparatus using a sieve having a mesh size of 0.005 mm, according to the following method:
Devices:
Sieve apparatus (from Topas GmbH, Dresden), consisting of:
electromagnetic sieve vibration device (EMS 755)
ultrasound disintegrator (UDS 751)
very fine particle test sieve (5 μm, optional: 10 μm, 15 μm, 20 μm, 25 μm, 30 μm)
special stand, incl. nonslip stand plate
analytical balance (accuracy 0.1 mg)
Spatula
Propeller stirrer
Ultrasonic bath
1 l beaker for preparing the wetting agent solution
250 ml beaker for preparing the dispersion
1 l beaker for collecting the filtrate
Drying oven, set at 80° C.
Wetting agent Hydropalat 3065, article no. 582930 888 (from Henkel KGaA)
Testing of the Sieves:
Each time before use, the very fine particle test sieve to be used is investigated for damage under an optical microscope.
Sample Preparation:
The samples are dried for 1 hour in a drying oven and then cooled for 30 min in a desiccator. In the case of fresh samples, the drying is dispensed with and the samples can be investigated directly.
Carrying Out the Analysis:
Preparation of the Wetting Agent Solution:
For the preparation of the 10% strength wetting agent solution, 100 g of Hydropalat (w=65%) are weighed in a 1 l beaker and made up to 650 ml with distilled water. The solution is stirred at an appropriate speed (no stirring in of air) for 5 min. The solution is then filtered.
Preparation of the Dispersion:
100-150 ml of 10% strength wetting agent solution are transferred to a 250 ml beaker. About 15 g of carbon black are metered into the solution with appropriate stirring. The weight of carbon black taken is accurately determined on an analytical balance and is noted.

The solution is now further stirred for 5 min. After the stirring, residues adhering to the stirrer are rinsed into the solution by means of distilled water. The beaker is then placed in the ultrasonic bath for 5 min. Finally, the solution is treated for a further 2 min by means of UDS 751.
Carrying Out the Sieving:
The weighed very fine particle sieve (accuracy: 0.1 mg) is clamped in the EMS 755, a firm seat of the sieve being ensured. The UDS 751 is placed in the middle of the sieve and is fastened. The distance to the bottom of the sieve (about 5 mm) is kept constant by means of a spacer during each measurement.

The EMS is set at level 4.5 and is switched on.
The UDS is set at the middle level and is likewise switched on.

The carbon black dispersion is now slowly introduced into the sieve. The distance to the upper sieve edge should not be less than 3 mm. The level of fill should be kept as constant as possible during the analysis.

Once the complete carbon black dispersion has been transferred, the beaker is rinsed with small amounts of distilled water, which are poured over the sieve. This is repeated until the beaker is clean.

From now on, the sieve is rinsed with small amounts of distilled water until the outflowing filtrate is clear.

The sieve is now introduced into a 600 ml beaker. The beaker is filled to about 1 cm with distilled water and introduced into the ultrasonic bath for 2 min.

The sieve is then once again clamped briefly in the EMS and rinsed clear a last time.

The sieve is now dried in the drying oven at 80° C. for half an hour, then cooled in the desiccator and weighed on the analytical balance.

Evaluation:

The sieve residue is calculated as follows:

$$\text{Sieve residue [ppm]} = \frac{m_R - m_E}{W} \cdot 10^6$$

$m_R$—Mass of sieve with residue [g]
$m_E$—Mass of empty sieve [g]
W—Weight taken [g]

Transmittance

The determination of the transmittance is carried out according to the standard ASTM D 1618, the determination of toluene discoloration.

Primary Particle Size

The determination of the mean primary particle size and the standard deviation of the primary particle size distribution are determined with the aid of transmission electron micrographs which are subsequently increased in size on transparent films, by measuring and counting at least 2000 primary carbon black particles and calculating the arithmetic mean and the standard deviation. The semiautomatic particle size analyzer TGZ 3 from Carl Zeiss according to Endter and Gebauer [F. Endter and H. Gebauer, Optik, 13, 97 (1956)] facilitates the counting work here.

Volatile Fractions

The determination of the volatile fractions at 950° C. is carried out according to DIN 53552.

Oil Requirement

The determination of the oil requirement (flow point method) is carried out according to DIN EN ISO 787-5.

BET Surface Area

The determination of the BET surface area is carried out according to DIN 66131-2 (or ISO 4652).

Blackness Value My

The determination of the blackness value My of powder pigment carbon black is carried out according to DIN 55979.

STSA Surface Area

The determination of the STSA surface area is carried out according to ASTM method D-5816-99.

Aggregate Size Distribution:

For measuring the aggregate size distribution curves, a disk centrifuge BI-DCP with red light diode from Brookhaven is used. This device is specially developed for the determination of aggregate size distribution curves of finely divided solids from extinction measurements and is equipped with an automatic measuring and evaluation program for determining the aggregate size distribution.

For carrying out the measurements, a dispersion solution is first prepared from 200 ml of ethanol, 5 drops of ammonia solution and 0.5 g of Triton X-100 and is made up to 1000 ml with demineralized water. Furthermore, a spin liquid is prepared from 0.5 g of Triton X-100 and 5 drops of ammonia solution and is made up to 1000 ml with demineralized water.

Thereafter, 20 ml of dispersion solution are added to 20 mg of carbon black and suspended in the solution in a cooling bath for the duration of 4.5 minutes with 100 watt ultrasonic power (80% pulses).

Before the beginning of the actual measurements, the centrifuge is operated for 30 minutes at a speed of 11 000 min$^{-1}$. 1 ml of ethanol is sprayed into the rotating disk and then a layer of 15 ml of spin liquid is carefully introduced underneath. After about one minute, 250 μl of the carbon black suspension are sprayed in and the measuring program of the device is started and the spin liquid in the centrifuge is covered with a layer of 50 μl of dodecane. A double determination of each sample to be measured is carried out.

The evaluation of the raw data curve is then effected using the calculation program of the device, taking into account the scattered light correction and with automatic baseline adjustment.

The ΔD50 value is the width of the aggregate size distribution curve at half peak height. The $D_W$ value is the volume-weighted mean value of the aggregate size distribution. The $D_{mode}$ value (modal value) is the aggregate size with the greatest frequency (peak maximum of the aggregate size distribution curve).

Examples 1-4

Figure 8:
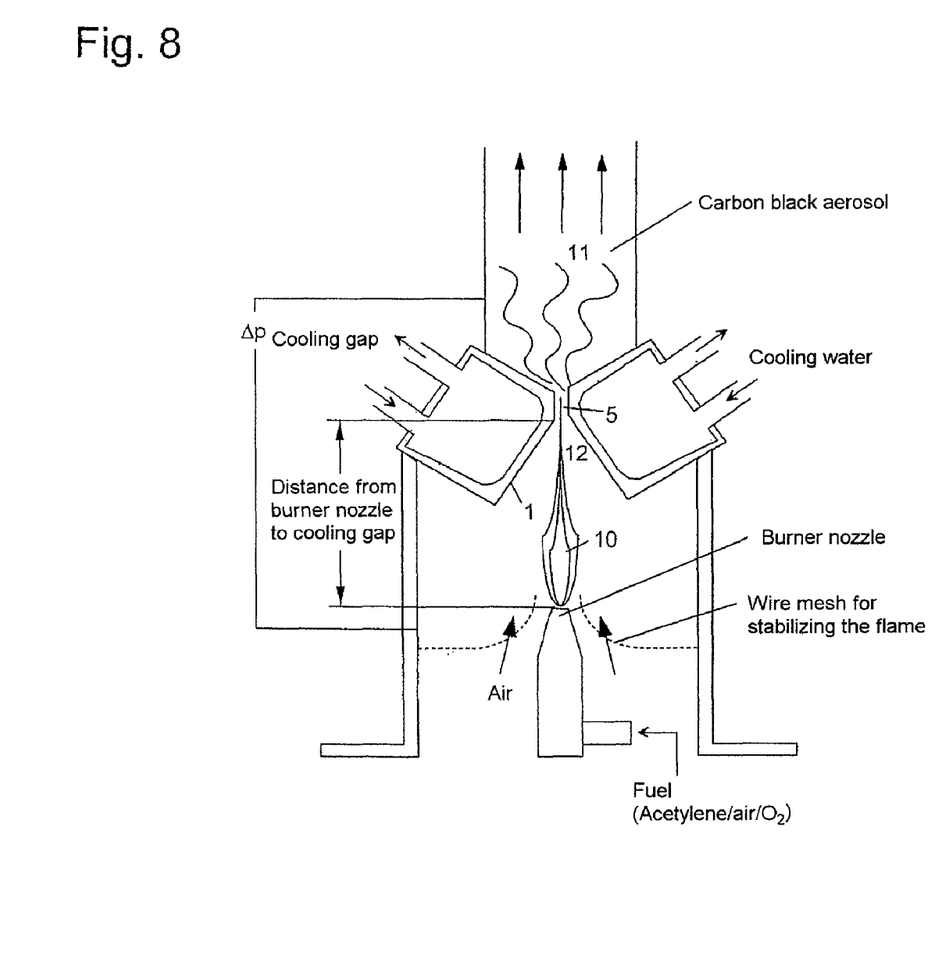
Figure 9:
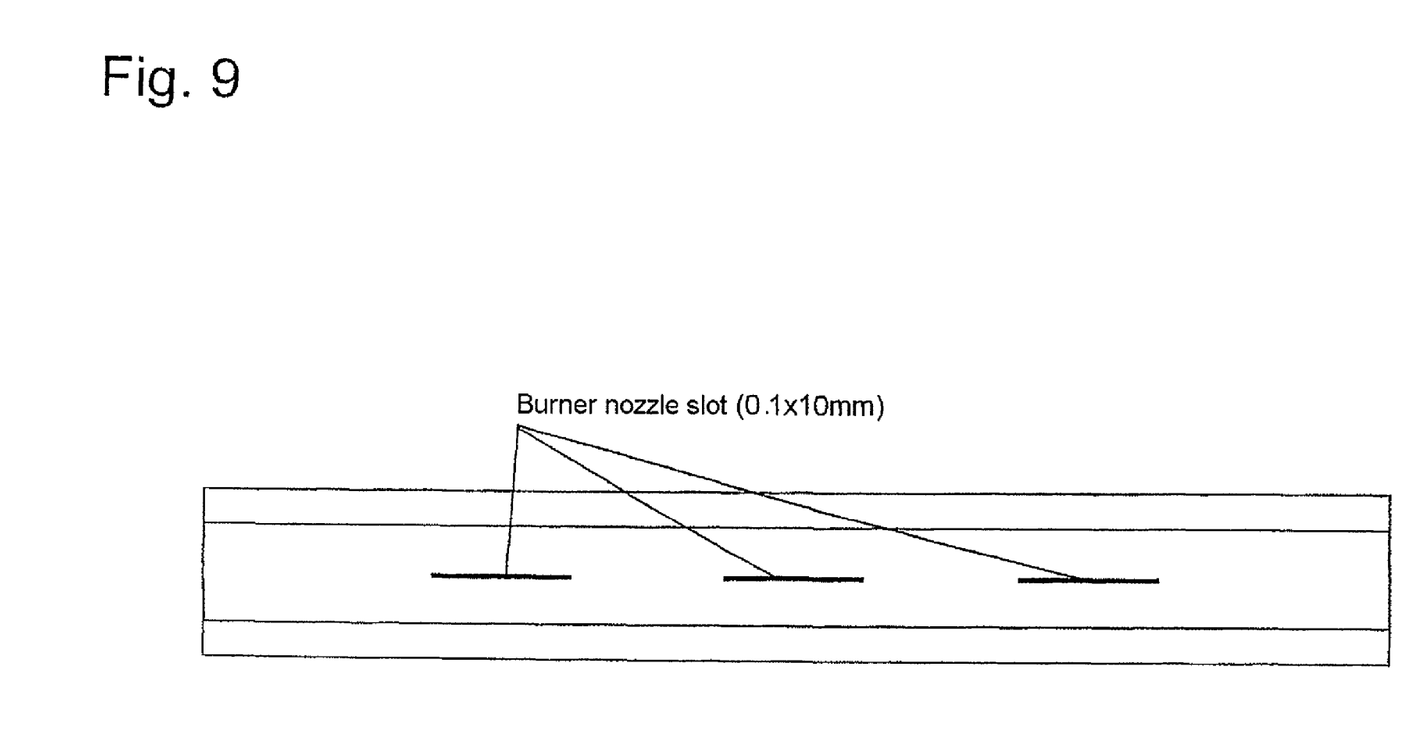

In a device according to FIG. 8, the carbon blacks according to the invention are prepared using the settings stated in table 1. The fuel used is acetylene. This can optionally be produced by air or pure oxygen. A static mixer ensures sufficient mixing of the two gases before entry into the burner nozzle. The burner nozzle used consists of three rectangular slots which are arranged a distance of 10 mm apart. The slot width is 0.1 mm and the slot length 10 mm, so that a total nozzle cross-sectional area of 3 mm² results. The burner nozzle is shown as a plan view in FIG. 9. The resulting flame is finally sucked into the actual cooling gap by applying reduced pressure and is quenched. The carbon black is then separated from the waste gases and is analyzed.

TABLE 1

| | Example 1 | Example 2 | Example 3 | Example 4 |
|---|---|---|---|---|
| Flame premix | acetylene/ — | acetylene/ air | acetylene/ oxygen | acetylene/ oxygen |
| Standard volume flow rates [L/h] | 74/— | 74/52 | 74/31 | 74/37 |
| Width and length of the cooling gap [mm] | 1/140 | 1/140 | 1/140 | 1/140 |
| Cooling surface in gap [mm²] | 2820 | 2820 | 2820 | 2820 |
| Pressure difference at the cooling gap [mbar] | 11 | 3 | 2.5 | 1.6 |
| Distance between burner nozzle and cooling gap [mm] | 100 | 80 | 80 | 60 |

Table 2 shows the analytical values of the carbon blacks according to the invention. In addition, the analytical values of comparative carbon blacks are shown. The comparative carbon blacks are prepared by the Degussa gas black method described in DE-A 2404536 but, in contrast to the commercial product, are not classified.

TABLE 2

|  | Example 1 | Example 2 | Example 3 | Example 4 | Comp. carbon black 1: unclassified FW 1 | Comp. carbon black 2: unclassified S 160 |
|---|---|---|---|---|---|---|
| pH | 3.3 | 3.6 | 3.9 | 3.8 | 4.2 | 3.8 |
| Residue on ignition [g] | 0.01 | 0.02 | 0.01 | 0.01 | 0.02 | 0.02 |
| 5 μm sieve residue [ppm] | 11 | 85 | 72 | 33 | 290 | 370 |
| Blackness value My | 239 | 259 | 265 | 283 | 273 | 263 |
| Transmittance [%] | 99 | 99 | 98 | 99 | 99 | 100 |
| Mean primary particle size [nm] | 34 | 21 | 17 | 13 | 15 | 20 |
| Standard deviation of the primary particle size [—] | 0.23 | 0.42 | 0.24 | 0.14 | 0.14 | 0.22 |
| Mean aggregate size, volume-weighted [nm] | 107 | 64 | 59 | 49 | 52 | 66 |
| Modal value of the aggregate size distribution, volume-weighted [nm] | 100 | 50 | 45 | 43 | 46 | 55 |
| Delta D50/mode [—] | 0.75 | 0.84 | 0.63 | 0.61 | 0.61 | 0.68 |
| Volatile components at 950° C. [%] | 2.5 | 4.7 | 4.6 | 7.6 | 4.8 | 4.3 |
| Oil requirement [g/100 g] | 391 | 409 | 670 | 837 | 840 | 620 |
| STSA surface area [m2/g] | 63 | 131 | 244 | 230 |  |  |
| BET surface area [m2/g] | 73 | 156 | 317 | 270 | 260 | 150 |

The carbon blacks according to the invention have a substantially smaller 5 μm sieve residue compared with the comparative carbon blacks. This low content of insoluble particulate substances permits the production of films and finishes having few specks.

What is claimed is:

1. A method for the production of carbon black or other flame aerosols comprising:
   a) removing heat from a flame by thermal conduction and/or radiation, the heat being released at a cooling surface which is a solid, cold surface or a liquid surface;
   b) forming a thin gas boundary layer between the flame and the cooling surface, in order to prevent the accumulation of aerosol particles on the cooling surface;
   c) accelerating or expanding flow formed by the flame and the boundary layer, in order to keep the flow laminar and to achieve as thin a boundary layer as possible; and
   d) withdrawing formed aerosol from the vicinity of the cooling surface.

2. The method according to claim 1, further comprising cleaning the cooling surface.

3. The method according to claim 1, wherein the thin gas boundary layer is air.

4. The method as claimed in claim 1, wherein the boundary layer is produced by feeding a gas stream between the flame and the cooling surface.

5. The method as claimed in claim 4, wherein the boundary layer is guided into the region of the flame by movement of the cooling surface.

6. The method as claimed in claim 1, wherein the boundary layer is guided into the region of the flame by movement of the cooling surface.

7. The method as claimed in claim 1, wherein the boundary layer is introduced between the flame and the cooling surface by a deflector plate.

8. The method as claimed in claim 1, wherein the boundary layer is produced by a flow of a gas, vapor or vaporizable liquid through the cooling surface having opening or pores.

9. The method as claimed in claim 1, wherein the boundary layer is produced by the vaporization of a liquid on the cooling surface.

10. The method as claimed in claim 1, wherein the flame is cooled in a convergent gap or convergent channel having cooling surfaces and having boundary layers.

11. The method as claimed in claim 1, wherein the flame is cooled in a convergent gap between two rotating rolls having cooling surfaces and having boundary layers.

12. The method as claimed in claim 1, wherein the aerosol-containing flow layer is removed from the cooling surface by a nozzle through which gas flows.

13. The method as claimed in claim 1, wherein the flame is guided between two cooling surfaces having two boundary layers.

14. The method as claimed in claim 1, wherein the flame is cooled in a convergent gap or convergent channel having cooling surfaces and having boundary layers, and wherein the flow velocity at the narrowest point of the convergent gap is chosen to be substantially higher than the exit velocity of the flame from the burner.

15. The method as claimed in claim 1, wherein the flame is cooled in a convergent gap or convergent channel, and wherein the flow velocity at the narrowest point of the convergent gap or channel is measured and regulated by a pressure difference present at the gap or channel.

16. The method as claimed in claim 1, wherein the cooling surface is a metal surface which is cooled from its back by water.

17. The method as claimed in claim 1, wherein the flame has a base and the method includes adjusting the distance between the base of the flame and the cooling surface.

18. The method as claimed in claim 1, wherein the flame has a base and the cooling surface has a convergent gap and the method includes adjusting the distance between the base of the flame and the narrowest point of the convergent gap.

19. The method as claimed in claim 1, further comprising directing both the flow of the flame and combustion gases produced by the flame upward.

20. The method as claimed in claim 1, wherein the boundary layer is at least initially a liquid.

21. The method as claimed in claim 1, wherein cooling with a cooling surface includes rotating a roller or plate into and out of a liquid.

22. The method as claimed in claim 1, wherein the cooling of the flame is carried out in a convergent gap comprising a revolving belt which is guided over a roller in the region of the gap and which passes through a liquid bath for cleaning and cooling.

23. The method as claimed in claim 1, wherein the cooling surface is a solid surface having an outer surface which the thin gas boundary layer contacts and a second, interior side, and said method further comprising supplying a cooling fluid to the second interior side such that the cooling fluid is free from flame contact.

* * * * *